US012679438B1

(12) United States Patent (10) Patent No.: US 12,679,438 B1
Tian (45) Date of Patent: Jul. 14, 2026

(54) STROLLER AND STROLLER FRAME

(71) Applicant: Shenzhen Zhichang Technology Co., LTD, Shenzhen (CN)

(72) Inventor: Weifeng Tian, Shenzhen (CN)

(73) Assignee: Shenzhen Zhichang Technology Co., LTD, Shenzhen (CN)

( * ) Notice: Subject to any disclaimer, the term of this patent is extended or adjusted under 35 U.S.C. 154(b) by 0 days.

(21) Appl. No.: 19/392,214

(22) Filed: Nov. 18, 2025

(30) Foreign Application Priority Data

Oct. 28, 2025 (CN) .......................... 202522284994.0

(51) Int. Cl.
B62B 7/10 (2006.01)
B62B 5/00 (2006.01)
B62B 9/14 (2006.01)
B62B 9/20 (2006.01)

(52) U.S. Cl.
CPC .............. B62B 7/10 (2013.01); B62B 5/0023 (2013.01); B62B 9/14 (2013.01); B62B 9/20 (2013.01)

(58) Field of Classification Search
CPC ........... B62B 7/10; B62B 5/0023; B62B 9/14; B62B 9/20; B62B 7/12; B62B 2205/04; B62B 7/086; B62B 7/08; B62B 2206/006; B60B 33/0068; B60B 33/0052; B60B 33/0071
See application file for complete search history.

(56) References Cited

U.S. PATENT DOCUMENTS 1,101,903 A * 6/1914 Bright ...................... B62B 9/14
296/111
6,908,087 B2 * 6/2005 Wintersgill ........... B62B 3/1492
280/37
7,810,613 B2 * 10/2010 Lin ........................... B60T 1/04
188/69

(Continued)

FOREIGN PATENT DOCUMENTS

CN 114148398 A * 3/2022 ............. B62B 9/147
CN 114771632 A * 7/2022 ............... B62B 9/14
(Continued)

OTHER PUBLICATIONS

Translated copy of CN-114148398-A (Year: 2026).*
Translated copy of JP-2020183206-A (Year: 2026).*

*Primary Examiner* — James A Shriver, II
*Assistant Examiner* — Ian Bryce Shelton
(74) *Attorney, Agent, or Firm* — Hemisphere Law, PLLC

(57) ABSTRACT

A stroller frame is provided, which includes front tubes and rear tubes. The stroller frame further includes a frame and sliders. The frame defines an accommodation space to accommodate the front tubes and the rear tubes. The sliders are movably connected to the front tubes and the rear tubes. The sliders are configured to drive the front tubes and the rear tubes to move into the accommodation space. The stroller frame has an unfolded state and a folded state. When the front tubes and the rear tubes extend out of the accommodation space, the stroller frame is in the unfolded state and is maintained in a stable configuration. When the front (Continued)

tubes and the rear tubes are retracted into the accommodation space, the stroller frame is in the folded state and is maintained in a stable configuration.

13 Claims, 12 Drawing Sheets

(56) References Cited

U.S. PATENT DOCUMENTS

| | | | | |
|---|---|---|---|---|
| 7,837,206 | B1 * | 11/2010 | Lee ..................... | B62B 5/0026 |
| | | | | 280/30 |
| 8,020,879 | B1 * | 9/2011 | Engdahl ................. | B62B 9/14 |
| | | | | 280/30 |
| 9,039,032 | B2 * | 5/2015 | Saville ................... | B62B 7/10 |
| | | | | 280/650 |
| 11,883,338 | B2 * | 1/2024 | Harrison ............... | H01H 13/18 |
| 12,447,773 | B1 * | 10/2025 | Wang ................. | B60B 33/0021 |
| 2004/0145135 | A1 * | 7/2004 | Wintersgill ......... | B60B 33/0002 |
| | | | | 280/33.991 |
| 2009/0139804 | A1 * | 6/2009 | Lin ..................... | B60B 33/025 |
| | | | | 188/1.12 |
| 2014/0028003 | A1 * | 1/2014 | Saville ................... | B62B 7/10 |
| | | | | 280/650 |
| 2014/0265255 | A1 * | 9/2014 | Wang ................. | B60N 2/2806 |
| | | | | 280/643 |
| 2018/0093692 | A1 * | 4/2018 | Xu ..................... | B62B 7/08 |
| 2018/0146757 | A1 * | 5/2018 | Singh Johar ............ | A45C 9/00 |
| 2018/0209166 | A1 * | 7/2018 | Bullock ................ | A45B 11/00 |
| 2021/0053600 | A1 * | 2/2021 | Wang ................. | B62B 5/0023 |
| 2021/0145669 | A1 * | 5/2021 | Harrison .............. | B60B 33/045 |
| 2025/0367974 | A1 * | 12/2025 | Matsushita .......... | B60B 33/026 |
| 2025/0375982 | A1 * | 12/2025 | Newkirk ............ | B60B 33/0068 |

FOREIGN PATENT DOCUMENTS

| | | | | |
|---|---|---|---|---|
| CN | 120024388 A | * | 5/2025 | .............. B62B 9/00 |
| EP | 1002710 A2 | * | 5/2000 | .............. B62B 7/08 |
| JP | 2020183206 A | * | 11/2020 | |
| WO | WO-2024093122 A1 | * | 5/2024 | ............ B62B 7/006 |

* cited by examiner

A-A

STROLLER AND STROLLER FRAME

TECHNICAL FIELD

The disclosure relates to the technical field of strollers, and more particularly to a stroller and a stroller frame.

BACKGROUND

A stroller (also referred to as baby stroller) is a handcart designed to carry an infant and be propelled by a guardian or caregiver.

The fold-and-store capability of the stroller have become increasingly significant. An area occupied by the stroller after being folded directly impacts the quality of life of a family. While adding an infant to the family is a happy thing, it also comes with a lack of space in a house. In addition to the newly added infant, elders, nannies, and other caregivers may need to join the family to take care of the infant. Therefore, a space utilization rate of the house becomes particularly important.

The compactness of a foldable stroller has become one of its core competitive advantages.

A patent with a Chinese publication No. CN223340713U discloses a foldable stroller that can fold the stroller, but a volume of the stroller after folding is still relatively large and a degree of compactness is still insufficient.

SUMMARY

A purpose of the disclosure is to provide a stroller frame that can be stored more compactly.

To achieve the above purpose, the disclosure provides the following technical solution: a stroller frame, which includes front tubes and rear tubes. The stroller frame further includes a frame and sliders. The frame defines an accommodation space to accommodate the front tubes and the rear tubes. The frame is provided with slide rails therein, and the slide rails are disposed in the accommodation space. The sliders are movably connected to the front tubes and the rear tubes. The sliders are configured to drive the front tubes and the rear tubes to move into the accommodation space. Each of the slide rails cooperates with a corresponding one of the sliders to allow the slider to slide longitudinally. The stroller frame has an unfolded state and a folded state. When the front tubes and the rear tubes extend out of the accommodation space, the stroller frame is in the unfolded state and is maintained in a stable configuration. When the front tubes and the rear tubes are retracted into the accommodation space, the stroller frame is in the folded state and is maintained in a stable configuration.

In an embodiment, the stroller frame further includes support brackets configured to maintain the stable configuration of the stroller frame in the unfolded state, and each of the support brackets includes two support rods and two protruding abutments. Ends of the two support rods are hinged to each other, and other ends of the two support rods are hinged to a corresponding one of the front tubes and a corresponding one of the rear tubes respectively. The two protruding abutments are disposed on the two support rods respectively, and the two protruding abutments are disposed at the ends where the two support rods are hinged to each other. When the two support rods rotate relative to each other, the two protruding abutments are located on an outer side of a rotation direction of the two support rods, and are configured to limit a maximum rotation angle of the two support rods to no greater than a preset angle.

In an embodiment, the frame further includes a locking mechanism configured to lock each of the sliders to the frame when the stroller frame is in the folded state.

In an embodiment, the locking mechanism includes an unlocking post rotatably connected to a top end of the frame. A reverse wedge-shaped locking tab extends outward from a side of the unlocking post. A positive wedge-shaped locking tab extends vertically outward from a surface of each of the sliders facing towards an inside of the frame, and the positive wedge-shaped locking tab is engaged with the reverse wedge-shaped locking tab.

In an embodiment, rotating mechanisms are respectively disposed at ends of the front tubes and the rear ends facing away from the frame. wheels of the stroller frame are caster wheels, and the caster wheels are fixed to the rotating mechanisms respectively. The ends of the front tubes and rear tubes connected to the rotating mechanisms are referred to as connecting ends.

In an embodiment, each of the rotating mechanisms includes a rotating arm, a connecting rod, a fixed member, a limiting plate, and a spring. The rotating arm is connected to a corresponding one of the wheels and a corresponding one of the front tubes and the rear tubes. The connecting rod is fixedly connected to an end of the rotating arm facing towards a corresponding one of the connecting ends. The connecting rod is vertically and slidably connected to the fixed member, and the fixed member is fixed to an inner wall of the corresponding one of the connecting ends. The limiting plate is integrally connected to an end of the connecting rod facing away from the rotating arm, and the limiting plate is perpendicular to the connecting rod. The spring is disposed between the limiting plate and the fixed member, and the spring is in a compressed state. The wheel is fixed to other end of the rotating arm, and the fixed member is fixed to a side wall of the corresponding one of the front tubes and the rear tubes. There are at least two engagement angles between the rotating arm and the connecting end, and one of the at least two engagement angles is configured to retract the wheel into the frame.

Another purpose of the disclosure is to provide a stroller that achieves improved foldability.

To achieve the above purpose, the disclosure provides the following technical solution: a stroller, which includes a stroller frame, an infant seat, and a backpack. The stroller frame includes front tubes and rear tubes. In addition, the stroller frame further includes a frame and sliders. The frame defines an accommodation space to accommodate the front tubes and the rear tubes. The sliders are movably connected to the front tubes and the rear tubes. The sliders are configured to drive the front tubes and the rear tubes to move into the accommodation space. The stroller frame has an unfolded state and a folded state. When the front tubes and the rear tubes extend out of the accommodation space, the stroller frame is in the unfolded state and is maintained in a stable configuration. When the front tubes and the rear tubes are retracted into the accommodation space, the stroller frame is in the folded state and is maintained in a stable configuration. The infant seat is fixed to a front side of the stroller frame.

In an embodiment, the backpack is fixed to a rear of the frame.

In an embodiment, a number of the front tubes is two, a footrest is disposed between the two front tubes, and the footrest is configured for an infant to step on when the infant is seated.

In an embodiment, sunshade mounting members are disposed on the frame, and a sunshade is mounted on the sunshade mounting members. A connecting tube is fixed perpendicularly to a side of each of the sunshade mounting members. Fixing rods are fixed to the sunshade, and a corresponding one of the fixing rods is inserted into the connecting tube. A set screw is threadedly connected to a side of the connecting tube and abuts against the fixing rod.

In an embodiment, a pull rod is fixed to the frame, and the pull rod is a telescopic rod. The pull rod is configured to be retractable into the frame when the pull rod (3) is in a contracted state.

In an embodiment, an armrest is fixed to the frame, and the armrest is configured to provide hand placement for an infant when the infant is seated.

In an embodiment, shoulder straps are disposed at a front side of the frame, and the shoulder straps are configured to allow the stroller to be carried on a back.

In an embodiment, the backpack is detachably connected to the frame through a zipper.

In summary, the disclosure may achieve the following beneficial effects compared to the related art.

1. By designing a movable structure hinged to the front tubes and the rear tubes, and supporting them with the support bracket, the stroller can be folded compactly while maintaining stable support.
2. Folding is more convenient, lifting up the front tubes and the rear tubes automatically folds and hangs down, and pushing down allows the sliders to be retracted into the frame along the slide rails respectively.
3. The disclosure offers a significantly higher degree of foldability and compact stowage.
4. After folding, the wheels of the rear tubes are fully retracted and no longer protrude, resulting in a more compact package that is easy to carry. Compared to existing designs that remain loose after folding and still require manual pushing, the disclosure represents a significant improvement.

DESCRIPTION OF REFERENCE SIGNS

1—frame; 10—armrest mounting member; 11—sunshade mounting member; 110—connecting tube; 111—set screw; 12—slide rail; 13—baffle; 14—accommodation space; 15—shoulder strap; 2—movable structure; 20—front tube; 200—connecting end; 21—rear tube; 22—support bracket; 220—support rod; 221—protruding abutment; 222—rotating connection plate; 23—slider; 24—footstep; 25—wheel; 26—rotating mechanism; 264—rotating arm; 260—connecting rod; 261—spring; 262—limiting plate; 263—fixed member; 2630—horizontal plate; 2631—vertical plate; 3—pull rod; 4—locking mechanism; 40—unlocking post; 41—positive wedge-shaped locking tab; 42—reverse wedge-shaped locking tab; 5—mounting plate; 6—armrest; 7—infant seat; 8—backpack; 80—zipper; 9—sunshade; 90—fixing rod.

DETAILED DESCRIPTION OF EMBODIMENTS

The following will provide a clear and complete description of technical solutions in embodiments of the disclosure in conjunction with attached drawings in the embodiments of the disclosure. Obviously, described embodiments are only a part of the embodiments of the disclosure, not all of them. Based on the embodiments of the disclosure, all other embodiments obtained by those skilled in the art without creative labor are within the scope of protection of the disclosure.

Embodiment 1

Figure 1:
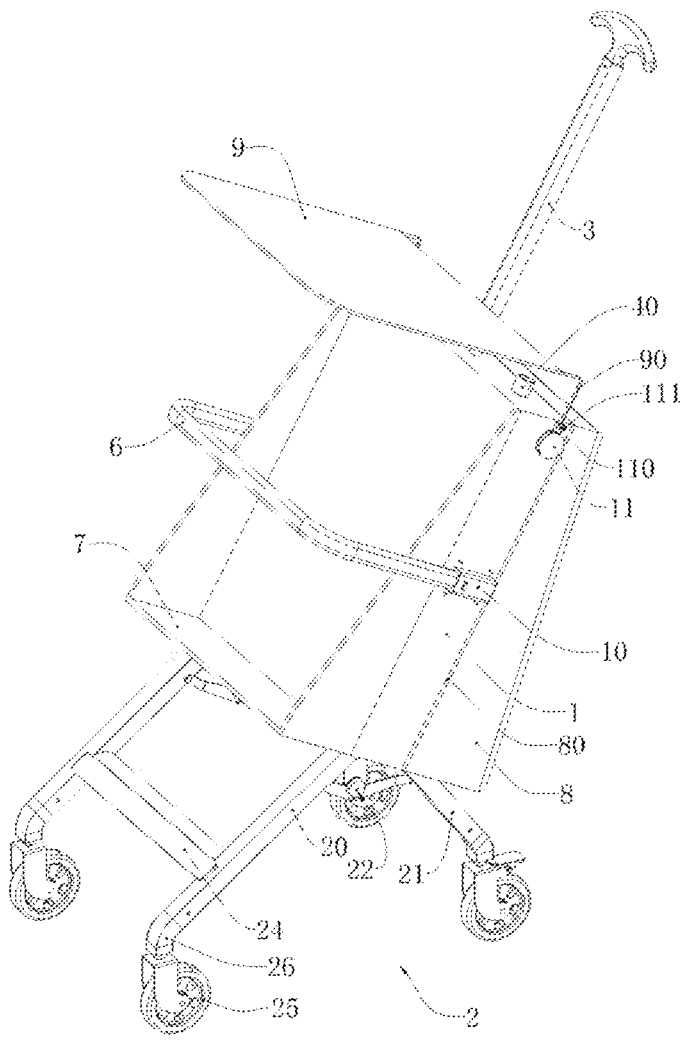
FIG. 1 illustrates a schematic diagram of an overall structure of a stroller according to an embodiment of the disclosure.
Figure 2:
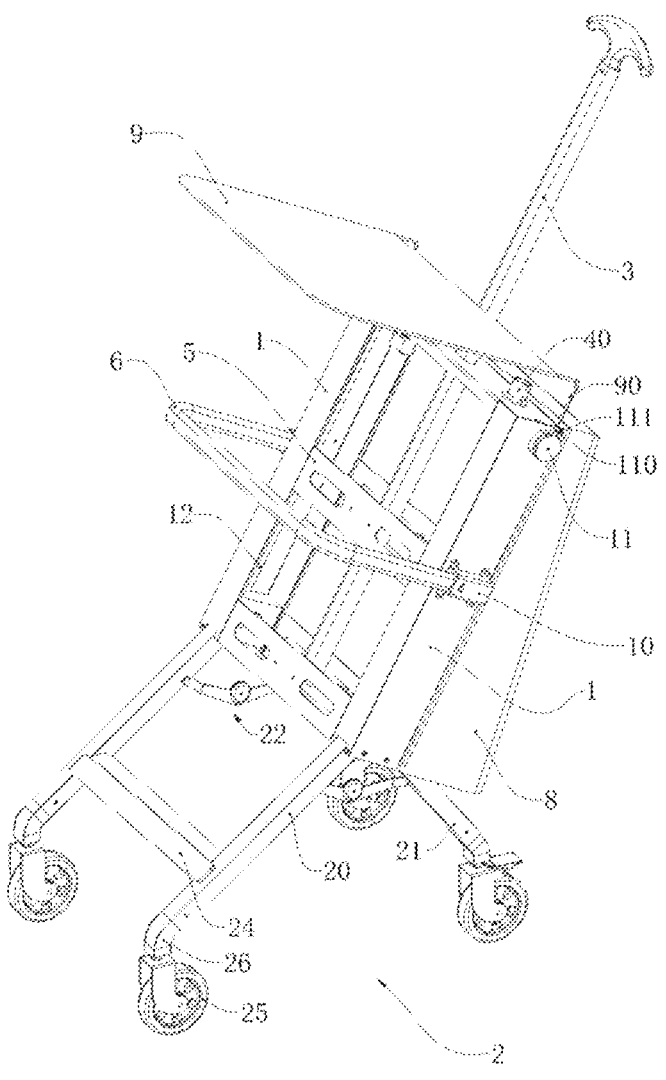
FIG. 2 illustrates a schematic diagram of an internal structure of the stroller according to the embodiment of the disclosure.

A foldable and stowable stroller, referring to FIGS. 1 and 2, includes a cubic frame 1 and a movable structure 2. In a folded state, the movable structure 2 is stowed within the frame 1. In a use state, the movable structure 2 extends from a bottom of the frame 1 to provide support and movement function for the frame 1. A pull rod 3 extends upward from a top edge of the frame 1. An infant seat 7 is fixed to a front of the frame 1, and a backpack 8 is mounted on a rear of the frame 1.

The pull rod is pushed or pulled by hand, and achieves movement of the stroller through the movable structure 2 at the bottom of the frame 1. The infant seat 7 is configured to carry an infant. The backpack is configured to store other items including shopping purchases, personal belongings, and some disassembled parts of the stroller after folding.

Figure 3:
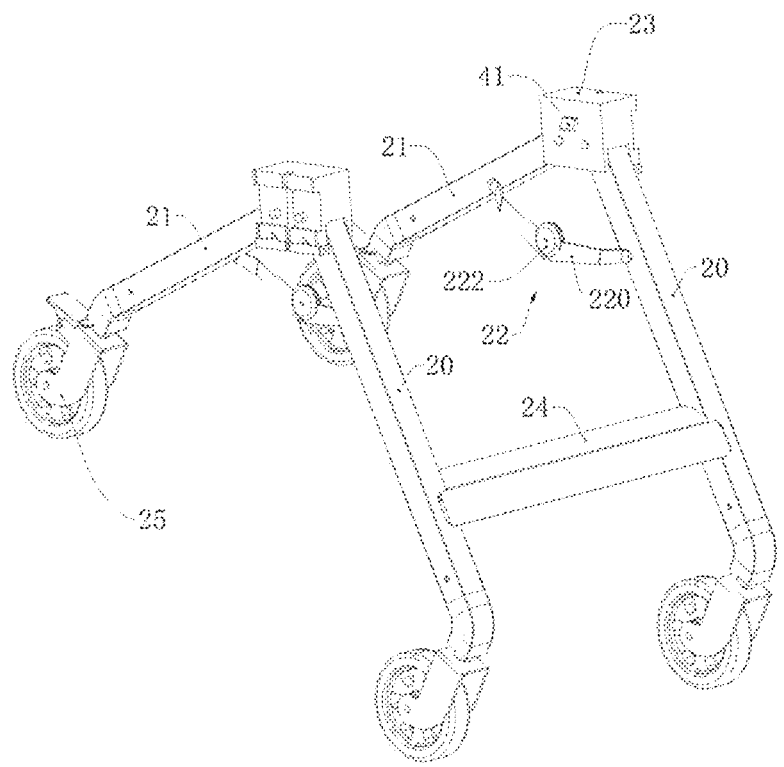
FIG. 3 illustrates a schematic diagram of a movable structure according to the embodiment of the disclosure.
Figure 4:
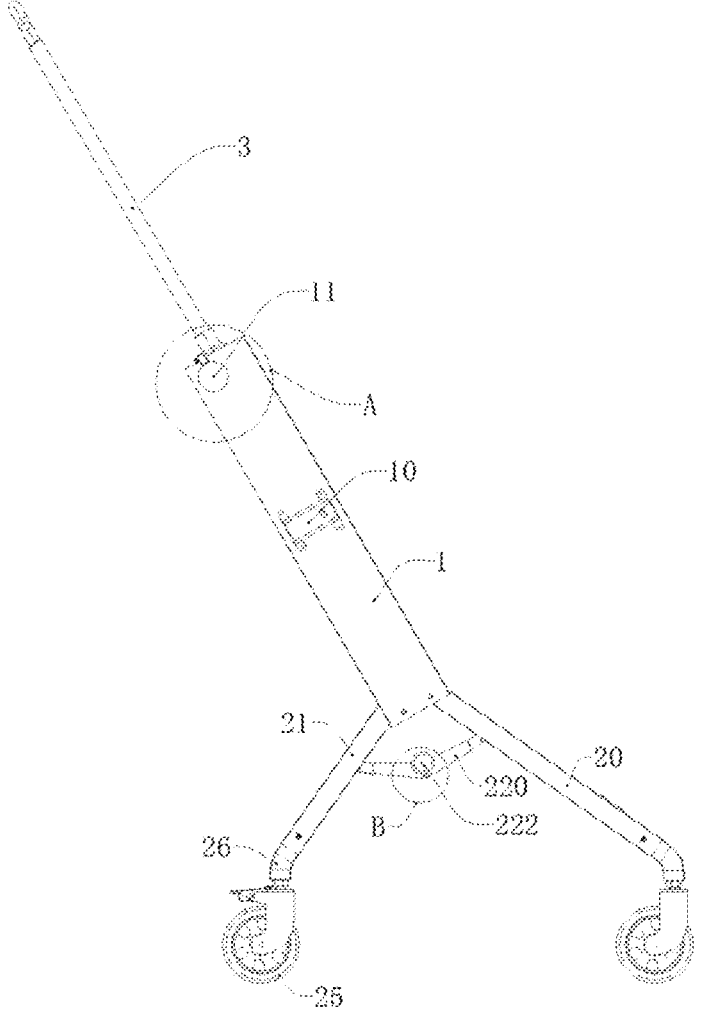
FIG. 4 illustrates a side view of a stroller frame according to the embodiment of the disclosure.
Figure 5:
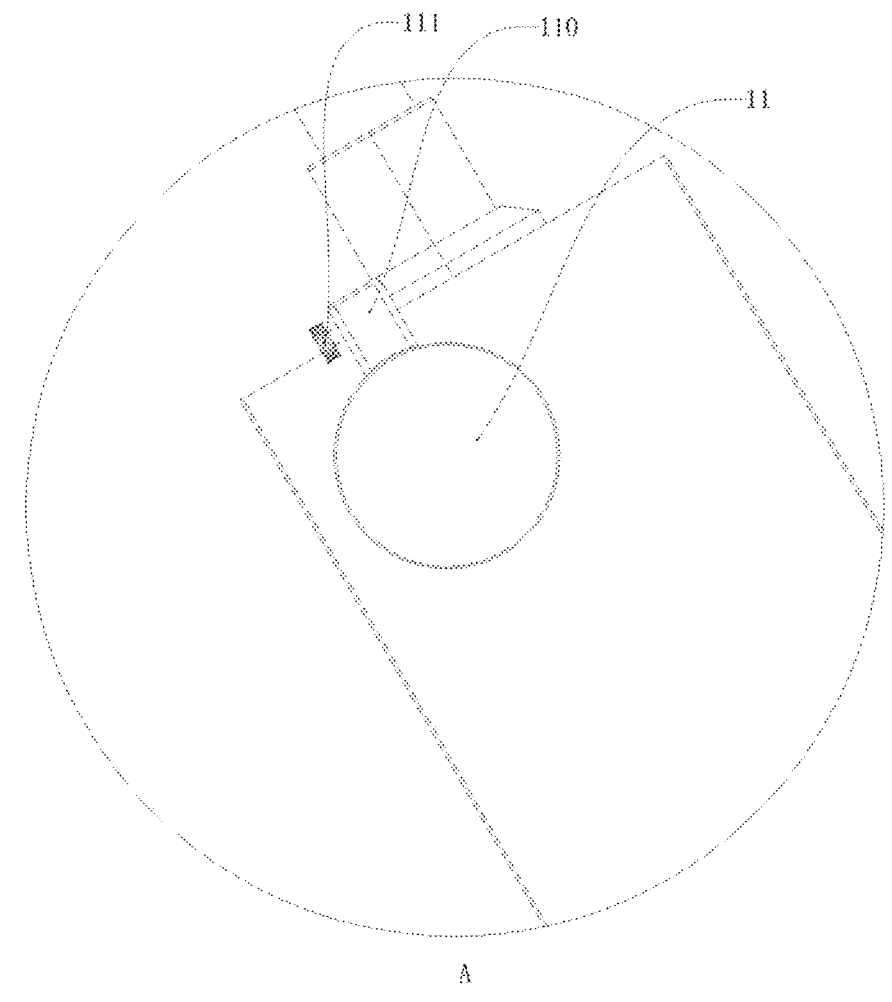
FIG. 5 illustrates an enlarged view of portion A of the stroller frame in FIG. 4 according to the embodiment of the disclosure.
Figure 6:
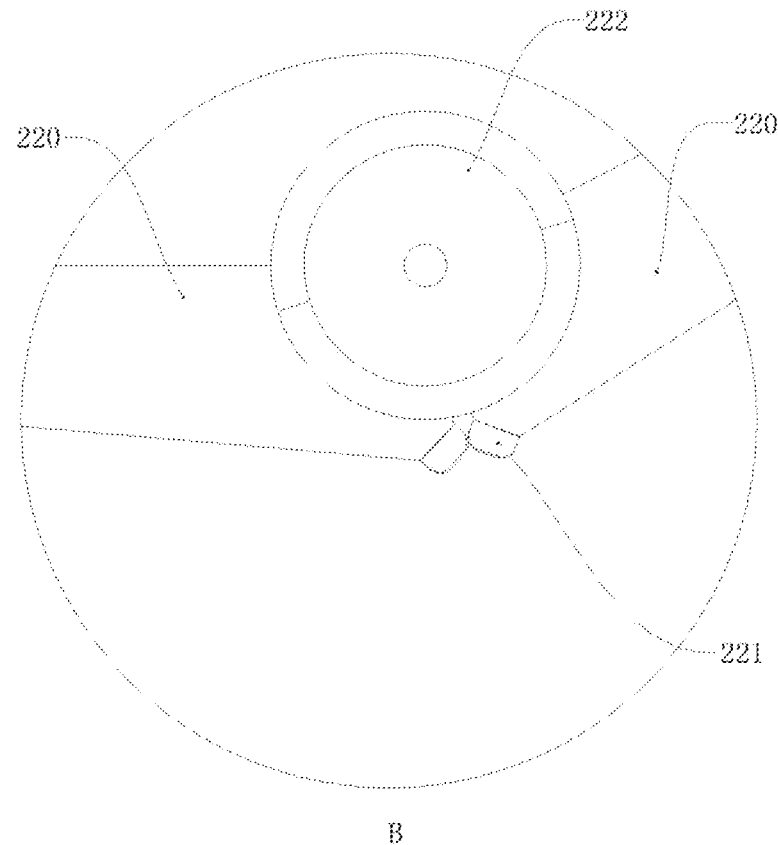
FIG. 6 illustrates an enlarged view of portion B of the stroller frame in FIG. 4 according to the embodiment of the disclosure.
Figure 7:
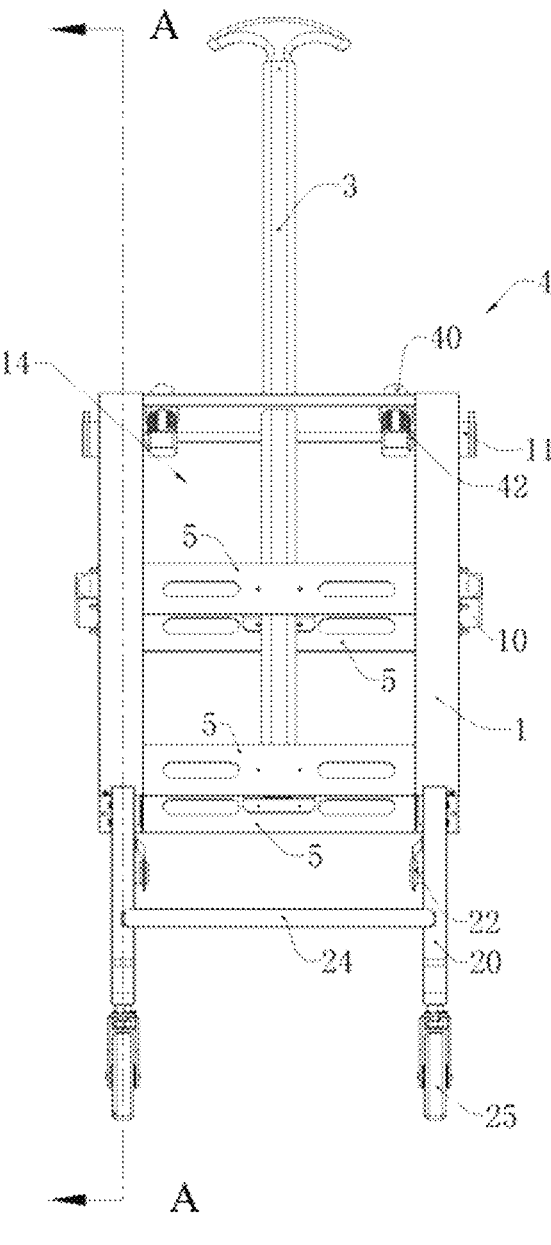
FIG. 7 illustrates a schematic structural diagram of the stroller frame according to the embodiment of the disclosure.
Figure 8:
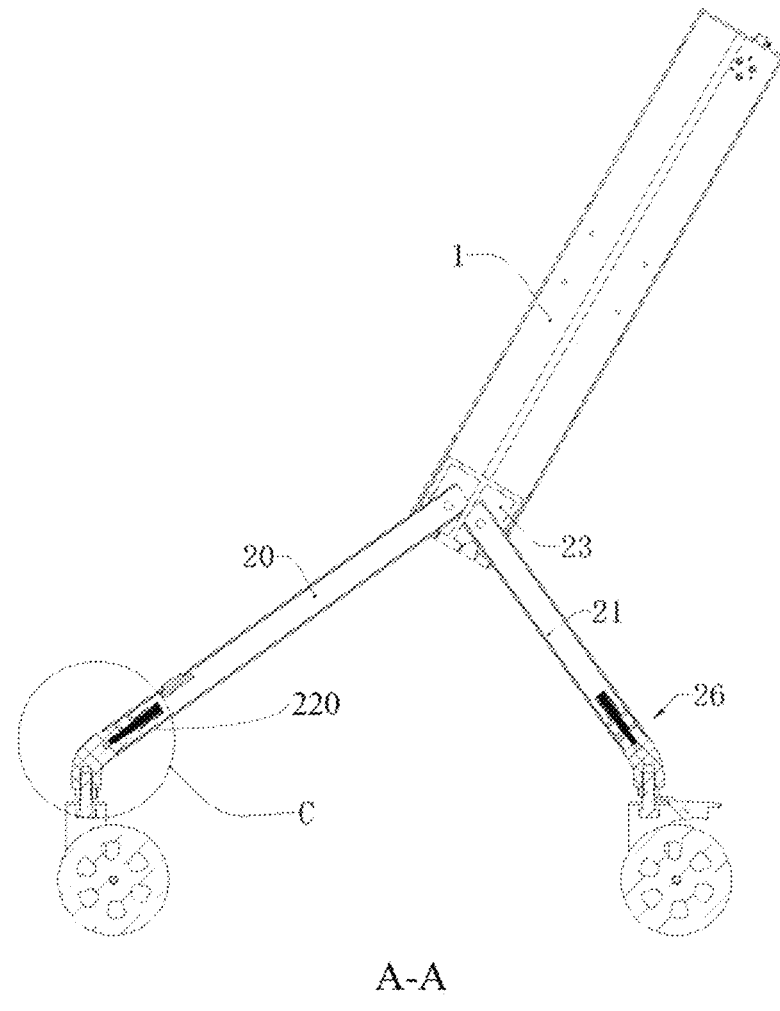
FIG. 8 illustrates a cross-sectional view of the stroller frame taken along line A-A in FIG. 7 according to the embodiment of the disclosure.

Referring to FIG. 3, the movable structure 2 includes two front tubes 20, two rear tubes 21, and sliders 23 hinged to the front tubes 20 and the corresponding rear tubes 21. Slide rails 12, configured to slide the sliders 23 respectively, are disposed at two sides of the frame 1. The sliders 23 are slidably connected within the slide rails 12, respectively. In the use state (i.e., the unfolded state) of the stroller, the sliders 23 are located at lowest ends of the slide rails 12, respectively. In the folded state of the stroller, the sliders 23 are located at topmost ends of the slide rails 12, respectively.

Referring to FIG. 4 to FIG. 8, a support bracket 22 is disposed between each front tube 20 and a corresponding one of the rear tubes 21. The support bracket 22 is config-ured to limit a maximum opening angle between the front tube 20 and the rear tube 21. In this embodiment, the maximum opening angle is greater than 90°. In the unfolded state, because the front tube 20 and the rear tube are unfolded, a corresponding one of the sliders 23 cannot retract into a corresponding one of the slide rails 12. Meanwhile, the limitation imposed by the support bracket 22 prevents the front tube 20 and the rear tube 21 from unfolding to a larger angle, thereby achieving a stable supporting state. Wheels 25 are disposed at bottom ends of the front tube 20 and the rear tubes 21. In this embodiment, the wheels 25 are caster wheels, configured to provide the movement function of the stroller.

In this embodiment, in order to facilitate the placement and fixation of the infant seat 7 and seating of the infant, a length of each front tube 20 is greater than a length of each rear tube 21.

The support bracket 22 includes two support rods 220 hinged to each other. Circular rotating connection plates 222 are fixed to the two support rods 220 respectively. The two rotating connection plates 222 are stacked and rotatably connected to each other so that the two support rods 220 are rotatably connected to each other through the two rotating connection plates 222. Protruding abutments 221 are respec-tively disposed at ends of the two support rods 220 facing towards each other (i.e., ends where the two support rods 220 are hinged to each other), and the protruding abutments 221 are disposed at bottoms of the rotating connection plates 222 respectively. When the two support rods 220 are rotated outward around the rotating connection plates 222 as an axis, the two protruding abutments 221 are abutted against each other, reaching a maximum angle (i.e., the maximum opening angle). In the present embodiment this maximum angle is set to 165°. In other embodiments it may be 150°, 120°, 170°, etc.

Two ends of the support bracket 22, i.e. other ends of the two support rods 220 facing away from each other, are rotatably connected to the corresponding front tube 20 and the corresponding rear tube 21 respectively. As the front tube 20 and the rear tube 21 are rotated to increase their included angle, the two rotating connection plates 222 move progres-sively closer to the corresponding slider 23, so that the support bracket 22, the front tube 20, and the rear tube 21 together form a convex quadrilateral. In the folded state, the two support rods 220 coincide with the front tube 20 and the rear tube 21 respectively, and at this time, the rotating connection plates 222 are farthest away from the slider 23.

In another embodiment, the support bracket 22, the front tube 20, and the rear tube 21 together form a concave quadrilateral, and the protruding abutments 221 are disposed at top positions of the rotating connection plates 222 respec-tively.

Figure 11:
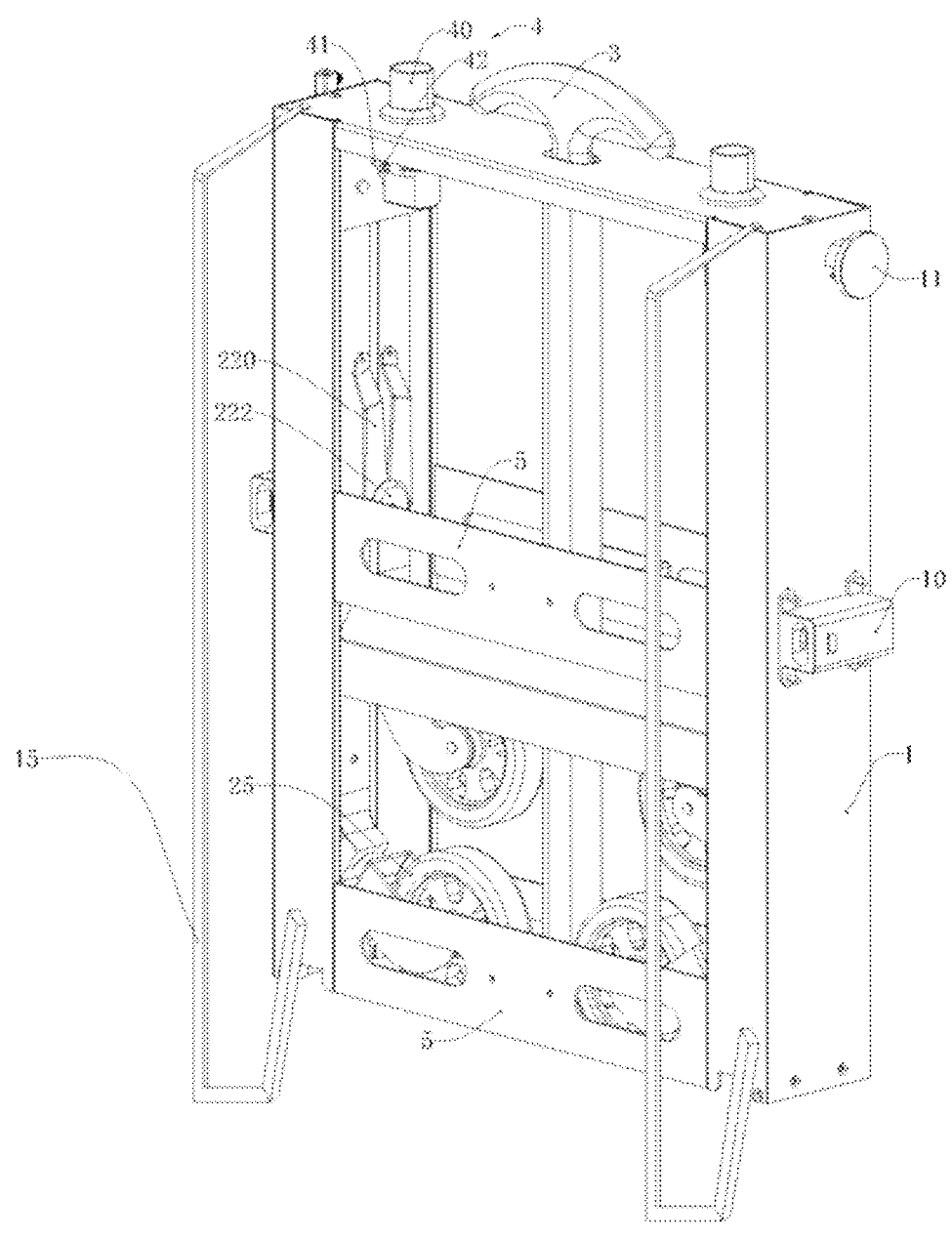
FIG. 11 illustrates a schematic diagram of the stroller frame in a folded state according to the embodiment of the disclosure.

Combining FIG. 11, during a folding process of the stroller, the pull rod 3 is lifted upward by a user. Under gravity the corresponding front tube 20 and the correspond-ing rear tube 21 move toward each other, the two support rods 220 rotate in opposite directions, and the two protrud-ing abutments 221 separate from each other until the front tube 20 and the rear tube 21 overlap and the two support rods 220 overlap with the front tube 20 and the rear tube 21. At this moment the front tubes 20 touch the ground, the rear tubes 21 leave the ground, and the front tubes 20, the rear tubes 21, and the frame 1 all hang vertically downward. When the user gradually reduces the upward pull on the pull rod 3, the sliders 23 are allowed to slide upward along the slide rails 12 respectively. In practice, the sliders 23 remain stationary while the frame 1, along with the slide rails 12, moves downward until the wheels 25 come into contact with the frame 1. This completes the folding process. At this stage, if the sliders 23 are fixed relative to the slide rails 12 respectively, the folding and storage task is fully accom-plished.

The entire folding process can be completed with just one hand, requiring only an upward lift followed by a downward release, and finally, a locking action.

If a width of frame 1 is greater than a diameter of each wheel 25, the wheels can be fully retracted into the frame. In the present embodiment, however, to minimize a thick-ness of the frame 1, a rotating mechanism 26 is disposed at a junction between each wheel 25 and a corresponding one of the front tubes 20 and the rear tubes 21. During folding, each wheel 25 is simply rotated 90° so that it is stowed laterally inside the frame 1.

The rotating mechanism 26 is disposed between the corresponding one of the front tubes 20 and the rear tubes 21 and each wheel 25. Taking the rotating mechanism 26 between a front tube 20 and a wheel 25 as an example, a top end of the rotating mechanism 26 is inserted into the front tube 20, and a bottom end of the rotating mechanism 26 is fixedly connected to the wheel 25. Cross-sectional shapes of the rotating mechanism 26 and the front tube 20 are square. An end of the front tube 20 connected to the rotating mechanism 26 can be referred to as a connecting end 200.

Figure 9:
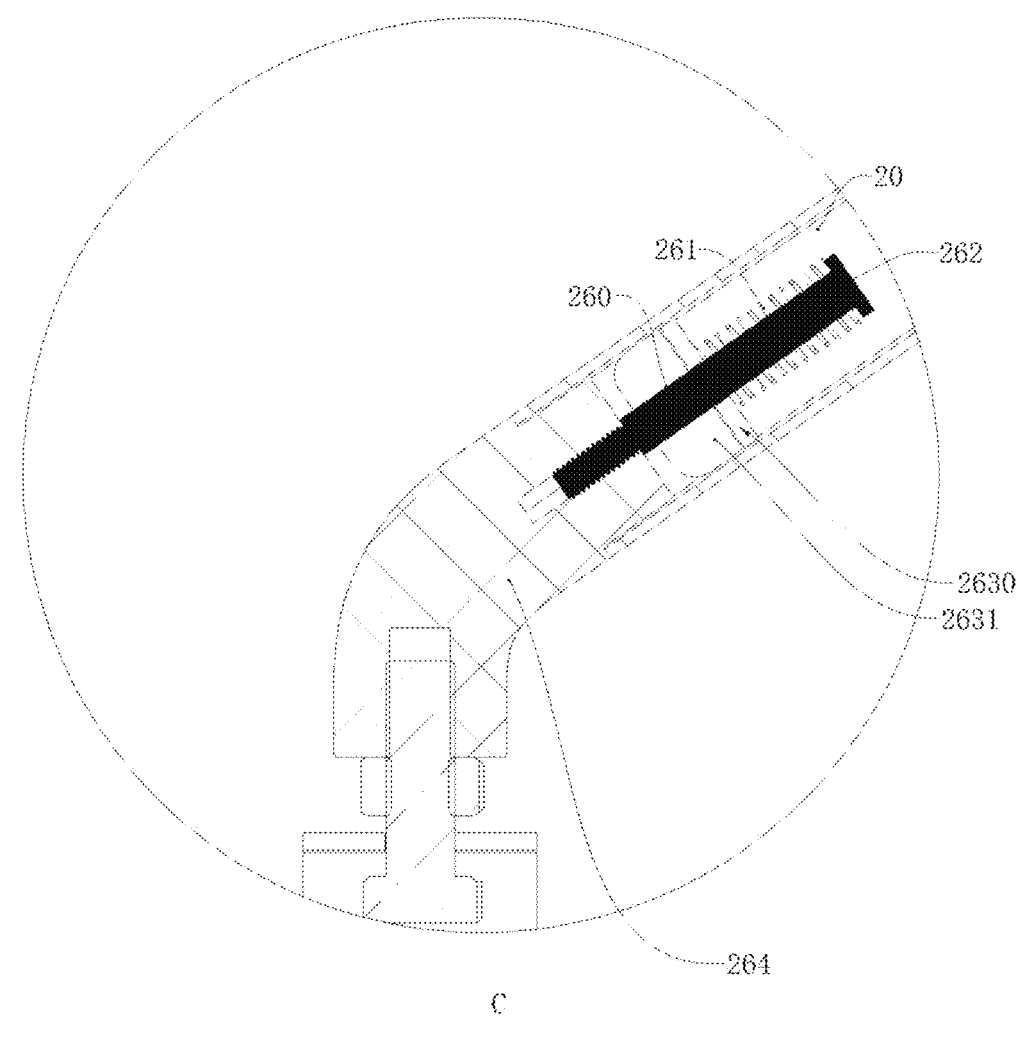
FIG. 9 illustrates an enlarged view of portion C of the stroller frame in FIG. 7 according to the embodiment of the disclosure.
Figure 10:
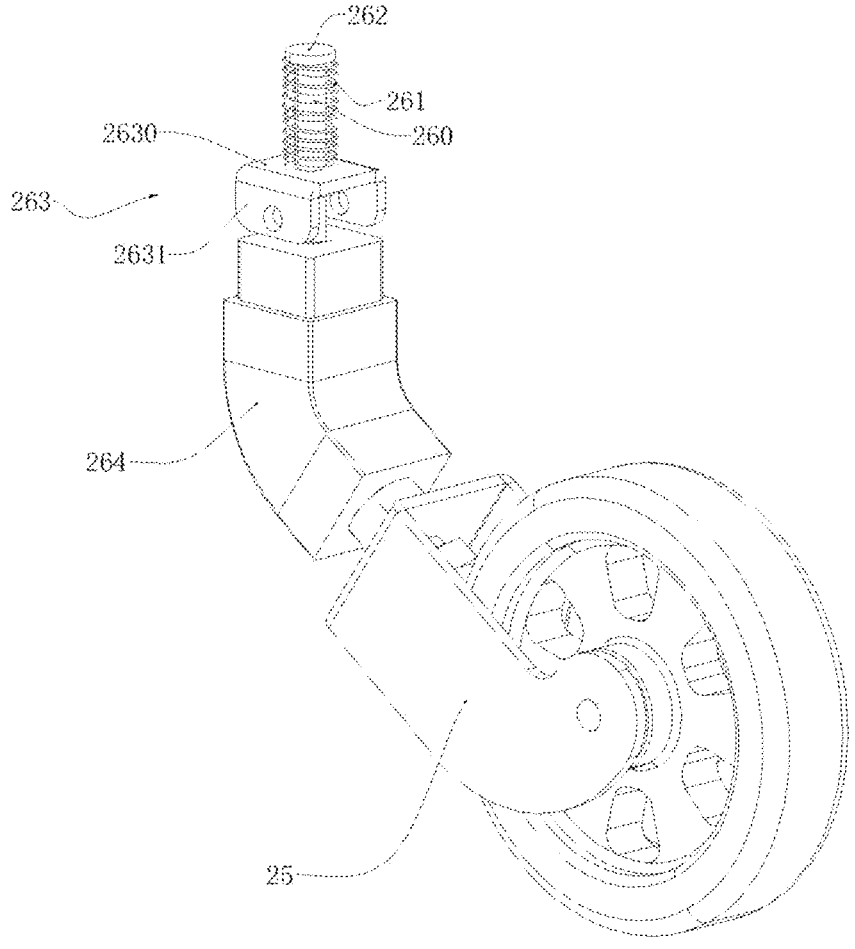
FIG. 10 illustrates a schematic diagram of a caster wheel and a rotation structure according to the embodiment of the disclosure.

Referring to FIGS. 9 and 10, the rotating mechanism 26 includes a rotating arm 264 and a connecting rod 260 threadedly connected to a top end of the rotating arm 264. A fixed member 263 is fixed to the connecting rod 260. The fixed member 263 includes a horizontal plate 2630 and a vertical plate 2631 that are perpendicular to each other, integrated into an L-shape. The fixed member 263 is verti-cally mounted inside a square tube of the front tube 20. The connecting rod 260 passes through a center of the fixed member 263 and is fixed to it. An end of the fixing rod 90 facing away from the rotating mechanism 26 extends out-ward perpendicularly with a limiting plate 262. A spring 261 is disposed between the limiting plate 262 and the fixed member 263, and two ends of the spring 261 are abutted against the limiting plate 262 and the fixed member 263, respectively. Two sides of the fixed member 263 are fixed to the front tube 20. A specific fixing method involves inserting or threadedly connecting from an outer wall of the front tube 20 to the fixed member 263. In this embodiment, the fixing method is insertion.

During folding, the rotating mechanism 26 is pulled out of the front tube 20, rotated 90°, and re-inserted into the front tube 20, thereby rotating the wheel 25 so that it can enter the frame 1 laterally. The rotating arm 264 is shaped as a curved arc to ensure that the wheel 25 remains vertically downward during operation.

During the process of pulling out the rotating mechanism 26, since the fixed member 263 is fixed to the front tube 20, the connecting rod 260 drives the limiting plate 262 to compress the spring 261. After rotating 90°, the rotating mechanism 26 is reinserted into the square tube of the front tube 20. Throughout this process, the rotating mechanism 26 does not completely detach from the front tube 20. More-over, due to the presence of the spring 261, a pull force is maintained between the front tube 20 and the rotating mechanism 26, ensuring connection stability and preventing loosening during long-term use. In addition, this rotation method achieves self-stabilization through the square-shaped design, eliminating the need for additional locking mechanisms for the rotating mechanism 26. This makes the stroller more robust during use.

To maintain stability in the folded state of the movable structure 2, a locking mechanism 4 is provided to connect each slider 23 and the frame 1 to achieve temporary fixation. The locking mechanism 4 includes a positive wedge-shaped locking tab 41 protruding from a side of the slider 23 and an unlocking post 40 passing through the top surface of the frame 1. A reverse wedge-shaped locking tab 42 extends vertically outward from a side of the unlocking post 40. The positive wedge-shaped locking tab 41 and the reverse wedge-shaped locking tab 42 form a locked engagement.

In this embodiment, the locking mechanism 4 adopts the existing "Plastic Press Lock MS753 Impact Door Lock Recessed Equipment Lock" in the related art. A latch of this product serves as the reverse wedge-shaped locking tab 42, and a top press switch serves as the unlocking post 40. When the unlocking post 40 is pressed, the negative wedge-shaped locking tab 42 (latch) retracts inward, enabling disengagement and unlocking from the positive wedge-shaped locking tab 41.

During specific engagement, when each slider 23 slides to a top position of the frame, the reverse wedge-shaped locking tab 42 interlocks with the positive wedge-shaped locking tab 41 on the slider 23. To unlock, simply press the unlocking post 40, causing the reverse wedge-shaped locking tab 42 to retract and disengage from the positive wedge-shaped locking tab 41, thereby achieving unlocking.

In this embodiment, mounting plates 5 are disposed on the front and the rear of the frame 1. The mounting plates 5 on the front of the frame 1 are configured to mount the infant seat 7, while the mounting plates 5 on the rear of the frame 1 are configured mount the backpack 8.

In this embodiment, a footrest 24 arranged in parallel is fixedly connected between the two front tubes 20 for the infant to step on when the infant is seated.

In this embodiment, a sunshade 9 is further provided, and the sunshade 9 is disposed above the infant seat 7. A side of the sunshade 9 facing towards the frame 1 is extended with fixing rods 90. Sunshade mounting members 11 are disposed on two sides of the top of the frame 1. A connecting tube 110 is vertically fixed to a side of each sunshade mounting member 11. A corresponding one of fixing rods 90 is inserted into the connecting tube 110, and a set screw 111 is threadedly connected to a side wall of the connecting tube 110 and abuts against the fixing rod 90.

Armrest mounting members 10 are disposed on two sides of the frame 1, and an armrest 6 is mounted on the armrest mounting members 10 to provide hand placement for an infant the infant when the infant is seated.

Shoulder straps 15 are disposed on the front of the frame 1 (as shown in FIG. 11). After the infant seat 7 is folded, the armrest 6 is removed, and the sunshade 9 is rotated and folded, the stroller, either alone or with the backpack 80 still attached, can be carried on the user's back via the shoulder straps 15. The backpack 80 is connected to the stroller by a zipper 80 (as shown in FIG. 1). When the backpack is not needed, only the stroller can be carried on the back.

In a specific implementation process, when folding the stroller is required, the pull rod 3 is pulled upward to release the interaction force between the bottom ends of the front tubes 20 and the rear tubes 21 with the ground. As a result, the front tubes 20 and the rear tubes 21 rotate downward around the sliders 23 into a freely hanging state. At this point, the sliding between the sliders 23 and the respective slide rails 12 is no longer restricted and can move freely. By operating the pull rod 3 to move downward, the front tubes

20 make contact with the ground. Due to the self-weight of the frame 1, it moves downward, while the sliding connection between the sliders 23 and the respective slide rails 12 allows the front tubes 20 and the rear tubes 21 to gradually retract into the frame 1 until the rotating mechanisms 26 reach a bottom edge of the frame 1 and can no longer advance. At this stage, the rotating mechanisms 26 are pulled out, rotated 90 degrees, and reinserted, enabling the wheels 25 to be positioned horizontally and fully retracted into the frame 1.

After the entire movable structure 2 is retracted into the frame 1, the unlocking post 40 is rotated to engage the positive wedge-shaped locking tab 41 with the reverse wedge-shaped locking tab 42, thereby completing the folding and storage of the stroller.

For better storage, in the embodiment, the pull rod 3 is a retractable pull rod 3. After folding, the pull rod 3 is retracted into the frame.

Embodiment 2

The present embodiment is substantially the same as the embodiment 1. The present embodiment differs from the embodiment 1 in that, cross-sections of the rotating mechanism 26, the front tube 20, and the rear tube 21 are regular octagons. In other embodiments, the cross-sections may also be squares with rounded corners, other shapes illustrated in the attached drawings, or any other shapes not exhaustively depicted that allow the rotating mechanism 26 and the connecting end 200 to have two engagement angles differing by 90° or approximately 90°.

Embodiment 3

Figure 12:
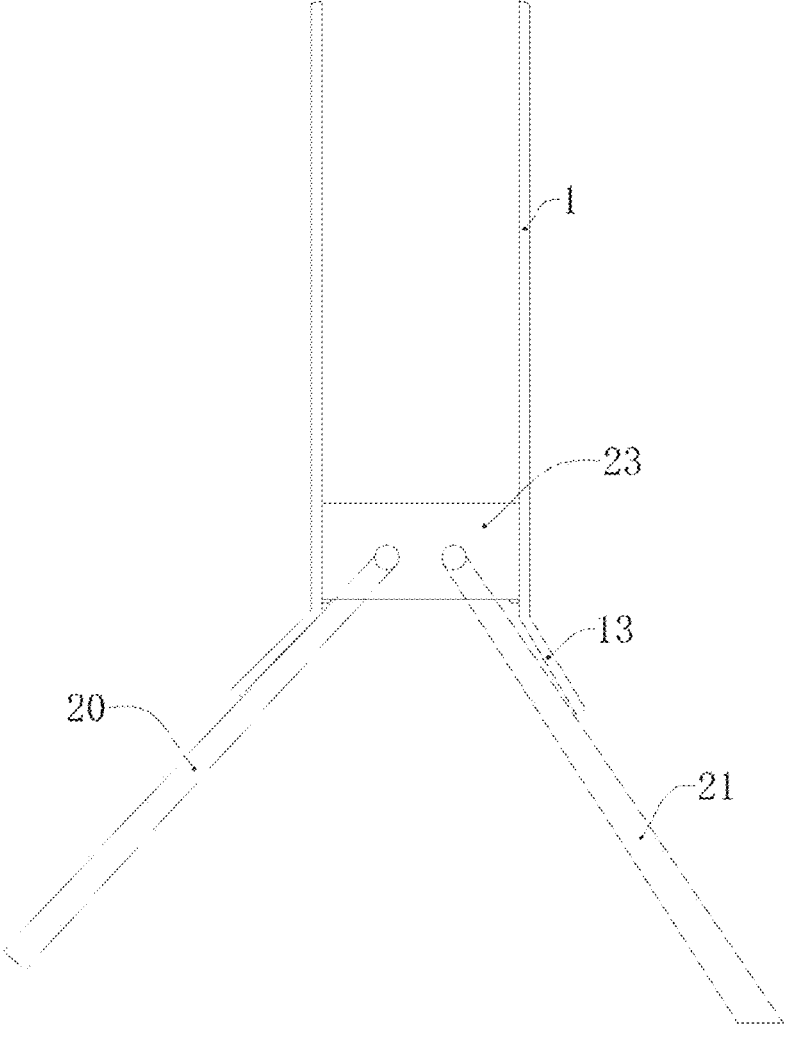
FIG. 12 illustrates a schematic structural diagram of a movable structure of a stroller frame according to an embodiment 3 of the disclosure.

The present embodiment is substantially the same as the embodiment 1. The present embodiment differs from the embodiment 1 in that, as shown in FIG. 12, the maximum opening angle between the front tube 20 and the rear tube 21 is limited by a restriction structure fixed on the frame 1, rather than by the support bracket 22 as in the embodiment 1. The restriction structure abuts against and restrains the front tube 20 and the rear tube 21 from their outer sides. For example, a bottom end of the frame 1 may be formed as a trapezoid, and waists of the trapezoid limits the maximum opening angle between the front tube 20 and the rear tube 21. In the present embodiment, inclined baffles 13 are fixed on the frame 1 to limit the maximum opening angle between the front tube 20 and the rear tube 21.

Terms used in the disclosure are only for the purpose of describing specific embodiments and is not intended to limit the disclosure. The singular forms of "a", "said" and "the" used in the disclosure and the appended claims are also intended to include the majority form, unless the context clearly indicates otherwise. It should also be understood that the term "and/or" used herein refers to and includes any or all possible combinations of one or more associated listed items.

It should be understood that although the disclosure model may use terms such as "first", "second" and "third" to describe various information, this information is not limited to these terms. These terms are only used to distinguish information of the same type from each other. For example, without departing from the scope of the disclosure, first information may also be referred to as second information, and similarly, the second information may also be referred to as the first information. Depending on the context, the word "if" used herein can be interpreted as "when", "upon" or "in response to determining".

Although the embodiments of the disclosure have been shown and described, those skilled in the art will appreciate that various changes, modifications, substitutions and variations may be made to these embodiments without departing from the principles and spirit of the disclosure. The scope of the disclosure is defined by the appended claims and their equivalents.

What is claimed is:

1. A stroller frame, comprising front tubes (20) and rear tubes (21), wherein the stroller frame further comprises:

a frame (1), defining an accommodation space (14) to accommodate the front tubes (20) and the rear tubes (21), wherein the frame (1) is provided with slide rails (12) therein, and the slide rails (12) are disposed in the accommodation space (14); and sliders (23), movably connected to the front tubes (20) and the rear tubes (21), and configured to drive the front tubes (20) and the rear tubes (21) to move into the accommodation space (14), wherein each of the slide rails (12) cooperates with a corresponding one of the sliders (23) to allow the slider (23) to slide longitudinally;

wherein the stroller frame has an unfolded state and a folded state; when the front tubes (20) and the rear tubes (21) extend out of the accommodation space (14), the stroller frame is in the unfolded state and is maintained in a stable configuration; when the front tubes (20) and the rear tubes (21) are retracted into the accommodation space (14), the stroller frame is in the folded state and is maintained in a stable configuration; and wherein the frame (1) further comprises a locking mechanism (4) configured to lock each of the sliders (23) to the frame (1) when the stroller frame is in the folded state, the locking mechanism (4) comprises an unlocking post (40) rotatably connected to a top end of the frame (1), a reverse wedge-shaped locking tab (42) extends outward from a side of the unlocking post (40), a positive wedge-shaped locking tab (41) extends vertically outward from a surface of each of the sliders (23) facing towards an inside of the frame (1), and the positive wedge-shaped locking tab (41) is engaged with the reverse wedge-shaped locking tab (42).

2. The stroller frame as claimed in claim 1, wherein the stroller frame further comprises support brackets (22) configured to maintain the stable configuration of the stroller frame in the unfolded state, and each of the support brackets (22) comprises:

two support rods (220), wherein ends of the two support rods (220) are hinged to each other, and other ends of the two support rods (220) are hinged to a corresponding one of the front tubes (20) and a corresponding one of the rear tubes (21) respectively; and two protruding abutments (221), disposed on the two support rods (220) respectively, wherein the two protruding abutments (221) are disposed at the ends where the two support rods (220) are hinged to each other; and wherein when the two support rods (220) rotate relative to each other, the two protruding abutments (221) are located on an outer side of a rotation direction of the two support rods (220), and are configured to limit a maximum rotation angle of the two support rods (220) to no greater than a preset angle.

3. The stroller frame as claimed in claim 1, wherein rotating mechanisms (26) are respectively disposed at ends of the front tubes (20) and rear tubes (21) facing away from the frame (1), wheels (25) of the stroller frame are caster wheels, and the caster wheels are fixed to the rotating mechanisms (26) respectively; and the ends of the front tubes (20) and the rear tubes (21) connected to the rotating mechanisms (26) are referred to as connecting ends (200).

4. The stroller frame as claimed in claim 3, wherein each of the rotating mechanisms (26) comprises:

a rotating arm (264), connected between a corresponding one of the wheels (25) and a corresponding one of the front tubes (20) and the rear tubes (21);

a connecting rod (260), fixedly connected to an end of the rotating arm (264) facing towards a corresponding one of the connection ends (200);

a fixed member (263), wherein the connecting rod (260) is vertically and slidably connected to the fixed member (263), and the fixed member (263) is fixed to an inner wall of the corresponding one of the connecting ends (200);

a limiting plate (262), integrally connected to an end of the connecting rod (260) facing away from the rotating arm (264), wherein the limiting plate (262) is perpendicular to the connecting rod (260); and a spring (261), disposed between the limiting plate (262) and the fixed member (263), wherein the spring (261) is in a compressed state; and wherein the wheel (25) is fixed to other end of the rotating arm (264), the fixed member (263) is fixed to a side wall of the corresponding one of the front tubes (20) and the rear tubes (21), there are at least two engagement angles between the rotating arm and the connecting end (200), and one of the at least two engagement angles is configured to retract the wheel (25) into the frame (1).

5. A stroller, comprising a stroller frame, an infant seat (7), wherein the stroller frame comprises front tubes (20) and rear tubes (21), and the stroller frame further comprises:

a frame (1), defining an accommodation space (14) to accommodate the front tubes (20) and the rear tubes (21); and sliders (23), movably connected to the front tubes (20) and the rear tubes (21), and configured to drive the front tubes (20) and the rear tubes (21) to move into the accommodation space (14);

wherein the stroller frame has an unfolded state and a folded state; when the front tubes (20) and the rear tubes (21) extend out of the accommodation space (14), the stroller frame is in the unfolded state and is maintained in a stable configuration; when the front tubes (20) and the rear tubes (21) are retracted into the accommodation space (14), the stroller frame is in the folded state and is maintained in a stable configuration;

wherein the frame (1) further comprises a locking mechanism (4) configured to lock each of the sliders (23) to the frame (1) when the stroller frame is in the folded state, the locking mechanism (4) comprises an unlocking post (40) rotatably connected to a top end of the frame (1), a reverse wedge-shaped locking tab (42) extends outward from a side of the unlocking post (40), a positive wedge-shaped locking tab (41) extends vertically outward from a surface of each of the sliders (23) facing towards an inside of the frame (1), and the positive wedge-shaped locking tab (41) is engaged with the reverse wedge-shaped locking tab (42); and wherein the infant seat (7) is fixed to a front side of the stroller frame.

6. The stroller as claimed in claim 5, wherein a backpack (8) is fixed to a rear of the frame (1).

7. The stroller as claimed in claim 5, wherein a number of the front tubes (20) is two, a footrest (24) is disposed between the two front tubes (20), and the footrest (24) is configured for an infant to step on when the infant is seated.

8. The stroller as claimed in claim 5, wherein sunshade mounting members (11) are disposed on the frame (1), and a sunshade (9) is mounted on the sunshade mounting members (11); a connecting tube (110) is fixed perpendicularly to a side of each of the sunshade mounting members (11), fixing rods (90) are fixed to the sunshade (9), and a corresponding one of the fixing rods (90) is inserted into the connecting tube (110); and a set screw (111) is threadedly connected to a side of the connecting tube (110) and abuts against the fixing rod (90).

9. The stroller as claimed in claim 5, wherein a pull rod (3) is fixed to the frame (1), the pull rod (3) is a telescopic rod, and the pull rod (3) is configured to be retractable into the frame (1) when the pull rod (3) is in a contracted state.

10. The stroller as claimed in claim 5, wherein an armrest (6) is fixed to the frame (1), and the armrest (6) is configured to provide hand placement for an infant when the infant is seated.

11. The stroller as claimed in claim 5, wherein shoulder straps (15) are disposed at a front side of the frame (1), and the shoulder straps (15) are configured to allow the stroller to be carried on a back.

12. The stroller as claimed in claim 6, wherein the backpack (8) is detachably connected to the frame (1) through a zipper (80).

13. A stroller frame, comprising front tubes (20) and rear tubes (21), wherein the stroller frame further comprises:

a frame (1), defining an accommodation space (14) to accommodate the front tubes (20) and the rear tubes (21), wherein the frame (1) is provided with slide rails (12) therein, and the slide rails (12) are disposed in the accommodation space (14); and sliders (23), movably connected to the front tubes (20) and the rear tubes (21), and configured to drive the front tubes (20) and the rear tubes (21) to move into the accommodation space (14), wherein each of the slide rails (12) cooperates with a corresponding one of the sliders (23) to allow the slider (23) to slide longitudinally;

wherein the stroller frame has an unfolded state and a folded state; when the front tubes (20) and the rear tubes (21) extend out of the accommodation space (14), the stroller frame is in the unfolded state and is maintained in a stable configuration; when the front tubes (20) and the rear tubes (21) are retracted into the accommodation space (14), the stroller frame is in the folded state and is maintained in a stable configuration; and wherein rotating mechanisms (26) are respectively disposed at ends of the front tubes (20) and rear tubes (21) facing away from the frame (1), wheels (25) of the stroller frame are caster wheels, and the caster wheels are fixed to the rotating mechanisms (26) respectively; the ends of the front tubes (20) and the rear tubes (21) connected to the rotating mechanisms (26) are referred to as connecting ends (200); and each of the rotating mechanisms (26) comprises:

a rotating arm (264), connected between a corresponding one of the wheels (25) and a corresponding one of the front tubes (20) and the rear tubes (21);

a connecting rod (260), fixedly connected to an end of the rotating arm (264) facing towards a corresponding one of the connection ends (200);

a fixed member (263), wherein the connecting rod (260) is vertically and slidably connected to the fixed member (263), and the fixed member (263) is fixed to an inner wall of the corresponding one of the connecting ends (200);

a limiting plate (262), integrally connected to an end of the connecting rod (260) facing away from the rotating arm (264), wherein the limiting plate (262) is perpendicular to the connecting rod (260); and a spring (261), disposed between the limiting plate (262) and the fixed member (263), wherein the spring (261) is in a compressed state; and wherein the wheel (25) is fixed to other end of the rotating arm (264), the fixed member (263) is fixed to a side wall of the corresponding one of the front tubes (20) and the rear tubes (21), there are at least two engagement angles between the rotating arm and the connecting end (200), and one of the at least two engagement angles is configured to retract the wheel (25) into the frame (1).

* * * * *